Patented May 31, 1938

2,119,457

UNITED STATES PATENT OFFICE 2,119,457

BELT DRESSING FOR MACHINERY OR LIKE

Henry Vincent Dyke, Auckland, New Zealand

No Drawing. Application June 2, 1936, Serial No. 83,163. In New Zealand July 12, 1935

5 Claims. (Cl. 134—17)

This invention relates to dressings used for application to the belting of machinery or the like so as to stop or substantially stop slip between the belt and the pulleys over which said belt passes, the objects of the present invention being to provide an improved belt dressing which will not only be more effective in preventing belt slip, but will also last with one application for a very considerable period in an effective condition, will be cheap in cost, will reduce power losses, will be simple to apply and will preserve and waterproof the belt to a very considerable extent and thus increase its life and tend to prevent shrinkage.

With belting used on machinery of all kinds whether such belting is made of leather, balata, rubber or cotton, belt slip is not only a source of power loss but also the cause of extra wear and tear on the belt due to sliding friction between said belt and the pulleys over which it passes and these defects being recognized, it is a general practice to apply belt dressing to the working surface of the belt in order to prevent the slip this being preferable to making the belt tighter due to a tight belt tending to cause excessive bearing wear.

The belt dressings at present in use comprise mixtures of essentially sticky materials such as beeswax, resin, gummy extracts from timber and the like and while these dressings will temporarily stop slip, they quickly harden and become non-effective so as to require a fresh application, tend to collect and hold any dust or dirt which may be incidental to the particular machine being driven and in themselves when freshly applied, tend to cause power losses due to the adhering of the belt to the pulleys such adhering in the case of ply belting tending to cause separation of the layers.

By my invention a dressing is provided which has no adhesive characteristic between the belt and pulleys, is not at all sticky after application to the belt and therefore has substantially no tendency to collect or hold dust or dirt, will not change its state under normal working conditions remaining effective until completely worn away, will with one application last for a considerable portion if not the whole of the life of the belt and will by its binding, sealing and flexible characteristics increase the working life of the belt.

Belting made of leather and also of fabricated rubber has long been recognized as superior to the balata or cotton fabric belt, but due to cost, the latter belts are more commonly used and are more subject to stretching and shrinking under variable atmospheric conditions.

According to the present invention a dressing is provided which embraces the best characteristics of leather and rubber and enables a working surface to be given to any belt which will be much superior to that of its natural surface.

According to this invention the improved belt dressing comprises leather and rubber as the main ingredients, and other substances which enable the rubber and leather to be mixed, enable the dressing to retain a form suitable for easy application to the belting and ensure setting of the dressing when applied.

In the example which I will now give, the proportions of ingredients referred to produce the best results but it will be understood that such proportions can be varied within limits which however result in an inferior dressing, such proportions being variable to approximately an extent of 25% increase in favour of the leather and distilled water and proportional decrease of the rubber and ammonia.

The following are the ingredients and their preferred proportions to produce 100 lbs. by weight of the dressing:—

| | Pounds |
|---|---|
| Ground leather ____(30 to 50 sieve fineness) __ | 18 |
| Raw rubber _____(75%) _____ | 52 |
| Liquid ammonia____(commercial 0.880) _____ | 6 |
| Distilled water ____($H_2O$) _____ | 18 |
| Latex_____(25% rubber)_____ | 4 |
| Casein_____(crude acid) _____ | 2 |

As an alternative, instead of the 52 lbs. of raw rubber (75%) above referred to, the same weight of gutta percha may be substituted, the results as to the finished product being the same although of greater cost due to increased cost of gutta percha as against raw rubber.

The selection of the leather is of very considerable importance in obtaining the best results as some leather when ground produces a soft dust-like substance quite unsuited for the purposes of the invention and furthermore the grinding of the leather has to be given care to ensure that it is sharply grated and not crushed or bruised.

Thus the leather preferred is hardest grade sole leather which is grated by apparatus similar to a nutmeg grater or like apparatus and then rubbed through sieves to 30 to 50 fineness, the coarser material not being useable.

The first step in the mixing of the ingredients is to heat 2 lbs. of the distilled water in a container (which will be called the "first" container) to about 100 degrees F., add the 2 lbs. of casein thereto and mix well and then add 1 lb. of the ammonia and stand away to cool.

In a second container the 52 lbs. of raw rubber is placed and 5 lbs. distilled water added and mixed well evenly.

In a third container, the remaining 11 lbs. of distilled water is placed and to this is added and well mixed the remaining 5 lbs. of ammonia.

Then the contents of the first container (in cooled state) are added and mixed with the contents of the third container and without any delay, these combined ingredients are added to the contents of the second container which is holding the raw rubber mass, thorough mixing being effected.

To this mixture 12 lbs. of the ground leather is now slowly added mixing in the added leather continuously and being careful to add only small quantities consistent with the speed of mixing and when the 12 lbs. of ground leather has been added, the 4 lbs. of latex is then added and thoroughly mixed.

It will be understood that the ammonia attacks the ground leather and tends to pulp the same, but as only a limited degree of such action is desired, by adding the 4 lbs. of latex immediately after the 12 lbs. of leather has been mixed in, such latex stops the action on the leather and at this stage the remaining 6 lbs. of ground leather is added and mixed thoroughly, this latter quantity of leather being substantially unaffected by chemical action.

The resultant mass is then ready for bottling or tinning, being in a fluid state of about thick paint consistency.

The dressing in course of preparation and in use must not come into contact with copper or alloys containing copper.

While the casein is not an essential ingredient in the production of the dressing, it is desirable to include said casein in that it acts as a stabilizer on the substance produced.

In use, the dressing is applied to belting with a brush in similar manner to application of paint or may also be smoothed on with a knife and after application, the belt should be put aside for one or more days so as to allow the dressing to dry thoroughly.

The drying period can be appreciably reduced by artificial heating as for instance by drying in a chamber heated to a temperature not exceeding 120 degrees F.

With new belting, the working surface should be wiped over with a wet cloth before applying the dressing and in the case of an old used belt, the old dressing, grease and dirt should be scraped off and the belt well rubbed over with a cloth wetted with benzine or other suitable substance which would tend to remove any oil or greasy and sticky patches on the belt working surface, the pulleys also being cleaned to a bright surface free of dirt or grease.

The belt when cleaned would then be rubbed over with a wet rag and the dressing applied, one coat being sufficient when properly dried to last for many months of service.

The dressing when applied sinks into or is absorbed by the belt to a certain extent especially in the case of balata and cotton belts and adheres very strongly leaving a perfectly dry, non-sticky surface of remarkably good gripping characteristics, such characteristics being produced by the ground leather, the rubber forming the adhesive means whereby the said leather is held on to the belt surface and providing the necessary flexibility to the coat of dressing.

I claim:

1. A belt dressing comprising substantially 18–22.5% by weight of sharply grated hardest sole leather, substantially 52–44% by weight of raw rubber, substantially 6–5% by weight of liquid ammonia, substantially 18–22.5% by weight of distilled water, and substantially 4% by weight of latex.

2. A belt dressing comprising substantially 18% by weight of sharply grated hardest grade sole leather, substantially 52% by weight of raw rubber, substantially 6% by weight of liquid ammonia, substantially 18% by weight of distilled water, and substantially 4% by weight of latex.

3. A belt dressing according to claim 2, including substantially 2% by weight of casein.

4. A method of making belt dressing comprising slowly adding a quantity of sharply grated hardest grade sole leather to an ammoniacal treating agent adapted to attack and pulp the leather, then adding latex that will prevent the action of an ammoniacal treating agent on the leather, and finally adding a further quantity of sharply grated hardest grade sole leather so that the latter will be substantially unaffected by the action of the pulping agent.

5. A method of making belt dressing, comprising slowly adding substantially 12 pounds of sharply grated hardest grade sole leather to a mixture of substantially 52 pounds of raw rubber, substantially 6 pounds of liquid ammonia, and substantially 18 pounds of distilled water, then adding substantially 4 pounds of latex, and finally adding substantially 6 pounds of sharply grated hardest grade sole leather.

HENRY VINCENT DYKE.